May 17, 1966 B. J. MOS 3,252,153

CROSS-FEED SHIELD

Filed Oct. 1, 1962 2 Sheets-Sheet 1

INVENTOR.
BOB J. MOS
BY
Christie, Parker & Hale
ATTORNEYS.

May 17, 1966 B. J. MOS 3,252,153

CROSS-FEED SHIELD

Filed Oct. 1, 1962 2 Sheets-Sheet 2

INVENTOR.
BOB J. MOS

BY Christie Parker & Hale
ATTORNEYS.

United States Patent Office 3,252,153
Patented May 17, 1966

3,252,153

CROSS-FEED SHIELD

Bob J. Mos, Covina, Calif., assignor to Consolidated Electrodynamics Corporation, Pasadena, Calif., a corporation of California Filed Oct. 1, 1962, Ser. No. 227,143
12 Claims. (Cl. 340—174.1)

The present invention relates to a magnetic transducer for substantially simultaneously reading and writing on a single channel of a magnetic recording medium, which may be referred to as a redundant head, and more particularly to a cross-feed shield for such magnetic transducers.

It is often desired to check the signal which has been recorded upon a magnetic recording medium as quickly as possible after recording, in order that necessary corrections may be rapidly made, and a redundant head may be utilized for such purposes. A redundant head is a magnetic transducer head in which each of one or more magnetic circuits for recording information upon a magnetic recording medium is spaced closely adjacent another magnetic circuit for sensing the information previously recorded upon the recording medium. Normally, there are a plurality of recording circuits arranged to record upon several channels on a single recording medium. The recording medium normally has a path of motion relative to the head, and the sensing circuits are arranged along each channel so that the recording medium passes them after passing the recording circuits. Accordingly, the head generally incorporates a pair of transducers, one for recording or "writing" information, and another for sensing or "reading" the same information.

Heretofore such redundant heads, although desirable, have not been able to be fully utilized, due to "cross-feed." This "cross-feed" is produced due to the recording signal being detected directly by the reading gap providing an error signal.

The writing and reading components of the head have previously been separated by sheets of high magnetic permeability material within the head. This has not been a satisfactory solution to the problem, however, because the flux radiates from the writing gap in a pattern of concentric spheres. The writing gaps extend substantially above the remainder of the head to a point adjacent the recording medium, and the flux patterns generated in the writing gaps bypass the separating high permeability material within the head.

Separation of the writing and reading gaps by a sufficient distance to diminish the strength of the radiating flux from the writing gaps is also unsatisfactory, as the desired immediacy of the checking by the reading gaps is lost due to the time necessary for the recording medium to pass between the widely separated gaps.

It has been attempted heretofore to place a shield parallel to the path of the recording medium and on the side thereof opposite the writing and reading gaps, but it has been found that such a shield permits the flux to be reflected back toward the recording medium to produce a secondary recording thereupon, which may be referred to as a reflected recording. Such reflected or secondary recording upon the medium after passage from the writing gap distorts the original recorded signal.

Similar difficulties due to the reflected or secondary recordings arise when a perpendicular shield is placed on the side of the recording medium opposite the gaps and between the writing and reading portions of the head. Considerable flux leakage to the reading gap area also occurs with a perpendicular shield as the pattern of concentric spheres extends outwardly, and cannot be overcome unless a very long and thick shield is utilized. The length of such shielding required for even moderate effectiveness is substantially prohibitive due to commercial requirements of limited space and also due to the extensive amount of shielding material required.

These difficulties are completely overcome by the present invention, which provides a shield comprising an elongated plate made from a high magnetic permeability material, disposed in such manner relative to the writing and reading gaps that it effectively prevents interference at the reading gaps by the flux radiating from the writing gaps. The plate, which may be substantially rectangular in shape is disposed on the side of the magnetic recording medium opposite the redundant head. One side of the plate along its longitudinal dimension may be referred to as the longitudinal base of the plate. The longitudinal base is disposed adjacent and parallel to the surface of the magnetic recording medium and is placed transverse to the path of the magnetic recording medium past the redundant head. The longitudinal base is further disposed along a line between the writing gaps and the reading gaps on the redundant head. The surface of the plate is inclined away from the magnetic recording medium at an acute angle to the path of the medium past the redundant head, and extends in the direction of the writing gaps. It has also been discovered that it is advantageous to construct the plate of a lamination of layers of high magnetic permeability material and layers of a material which is a good conductor, such as copper. The layers of the electrically conducting material such as copper function as an effective shunt to the high frequency flux changes. A bracket for holding the shield in the desired position relative to the redundant head and the magnetic recording medium is also provided.

It is found that a shield positioned according to the present invention effectively channels the flux to protect the reading gap area from interfering flux radiating from the writing gap area.

A cross-feed shield in accordance with the present invention makes possible close placement of writing and reading gaps, and by simple modification may be adapted to any combination of writing and reading gaps, closely-spaced consecutive writing gaps on different channels, or other adaptations wherein it is desired to have concurrent, non-interfering action with reference to a single magnetic recording medium.

The invention is described in more detail in reference to the accompanying drawings, in which.

Figure 1:
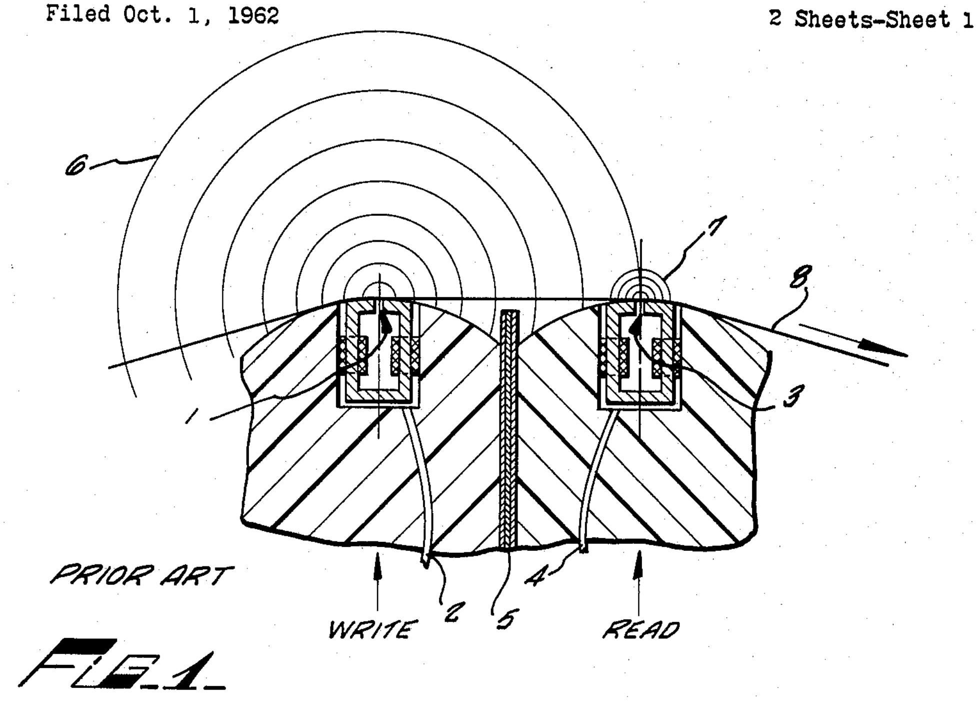
FIG. 1 is a cross-sectional view of a redundant recording head, schematically showing the patterns of radiating flux at the writing and reading gap areas, in accordance with the prior art arrangements.

Referring now to the drawings, wherein like numerals are used to designate like elements on all of the figures, a redundant head is shown, comprised of a magnetic recording circuit, or writing gap illustrated schematically at 1, coupled to its electrical input lead 2 and a magnetic sensing circuit, or reading gap illustrated schematically at 3, coupled to its output electrical lead 4. The writing gap 1, of which there may be a plurality disposed longitudinally along the entire head, is separated from the reading gap 3, of which there may also be a plurality disposed longitudinally along the entire head, by a conventional shield 5 made of high magnetic permeability material. The conventional shield 5 is vertically disposed within the head and is placed longitudinally therethrough between the writing gaps 1 and reading gaps 3. A magnetic recording medium 8 such as magnetic tape is shown passing the head in the direction of the arrow. In FIG. 1, wherein no shield in accordance with the present invention is provided, it is seen that the flux patterns 6 radiating from the writing gap 1 extend in concentric spheres to the reading gap 3 to provide an error signal which is detected by the reading gap.

Figure 2:
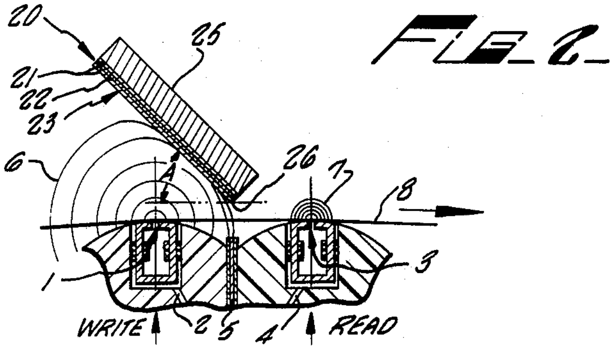
FIG. 2 is a cross-sectional view of a redundant recording head equipped with a cross-feed shield according to one embodiment of the present invention, schematically showing the radiating flux patterns at the writing and reading gap areas.

Referring now to FIG. 2, a cross-section of a cross-feed shield indicated generally at 20 in accordance with the present invention is shown. The shield 20, in this embodiment, is a substantially rectangular plate comprised of a lamination of a plurality of layers of a high magnetic permeability material 21 and layers of another material 22 such as copper which is a good conductor, disposed between the layers of high magnetic permeability material 21. It has been found that in the preferred form the high magnetic permeability material 21 may be an alloy of 79% nickel+4% molybdenum and iron. Each layer of high permeability material may have a thickness of .010 inch. It is, of course, understood that any material of a high magnetic permeability may be utilized instead of the alloy described. The thickness and number of layers may be varied according to the requirements of a particular installation, for example, due to varying strengths of the signal radiating from the writing gaps 1. In the preferred form the layers of a material which is a good conductor 22 are made from copper of substantially .006 inch thickness. The layers of material which is a good conductor 22 may be omitted, although the provision of such layers does improve operation of the shield 20, by acting to shunt the high frequency flux changes.

Satisfactory operation is achieved by a shield 20 having a single surface indicated generally at 23 angularly facing the writing gaps 1. The shield 20, which may be held in place by a bracket 25, is disposed on the opposite side of the recording medium 8 from the writing gaps 1 and reading gaps 3, and extends longitudinally along the length of the head. The shield 20 is mounted so that the longitudinal base 26 of the shield 20 is transverse to the path of the recording medium 8 past the head, and the shield 20 is attached to the surface of the bracket 25 nearest the recording medium 8. The longitudinal base 26 is disposed along a line parallel to the surface of the magnetic recording medium and lying between the writing gaps 1 and the reading gaps 3. Best results are obtained when the base 26 is disposed midway therebetween adjacent the conventional inter-gap shield 5. The longitudinal base 26 is closely adjacent to the recording medium, and although the clearance required is variable according to the particular installation, in the preferred form the clearance between the base 26 and the recording medium 8 is approximately .010 inch.

Surface 23 of the shield 20 is inclined to the path of the recording medium 8 at an angle A, which must be an acute angle, in order to eliminate undesirable secondary recording, and optimum results are obtained when such angle is in the range of 35° to 55°, inclusive, preferably 45°. It should be noted that in the embodiment of FIG. 2 the surface 23 of the shield 20 is also inclined at the acute angle A from a line drawn between the writing and reading gaps 1 and 3. The high magnetic permeability material 21 serves as a barrier to the flux patterns 6 radiating through the air from the writing gaps 1 by providing a path of less reluctance therefor and thereby eliminates interference with the signal 7 at the reading gaps 3, as schematically shown in FIG. 2.

Figure 3:
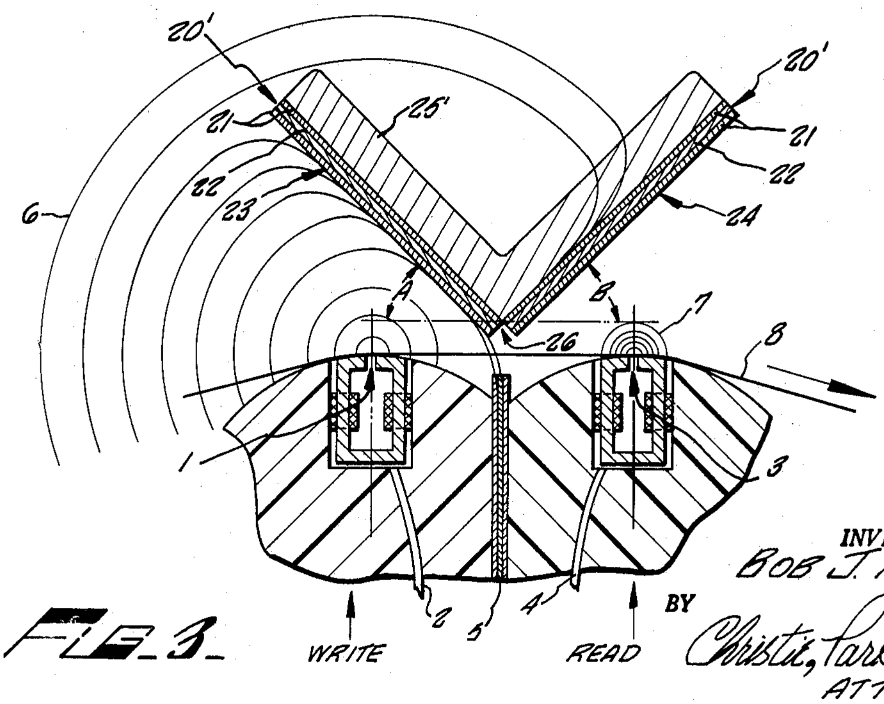
FIG. 3 is a cross-sectional view of a redundant recording head equipped with a preferred embodiment of a cross-feed shield according to the present invention.
Figure 4:
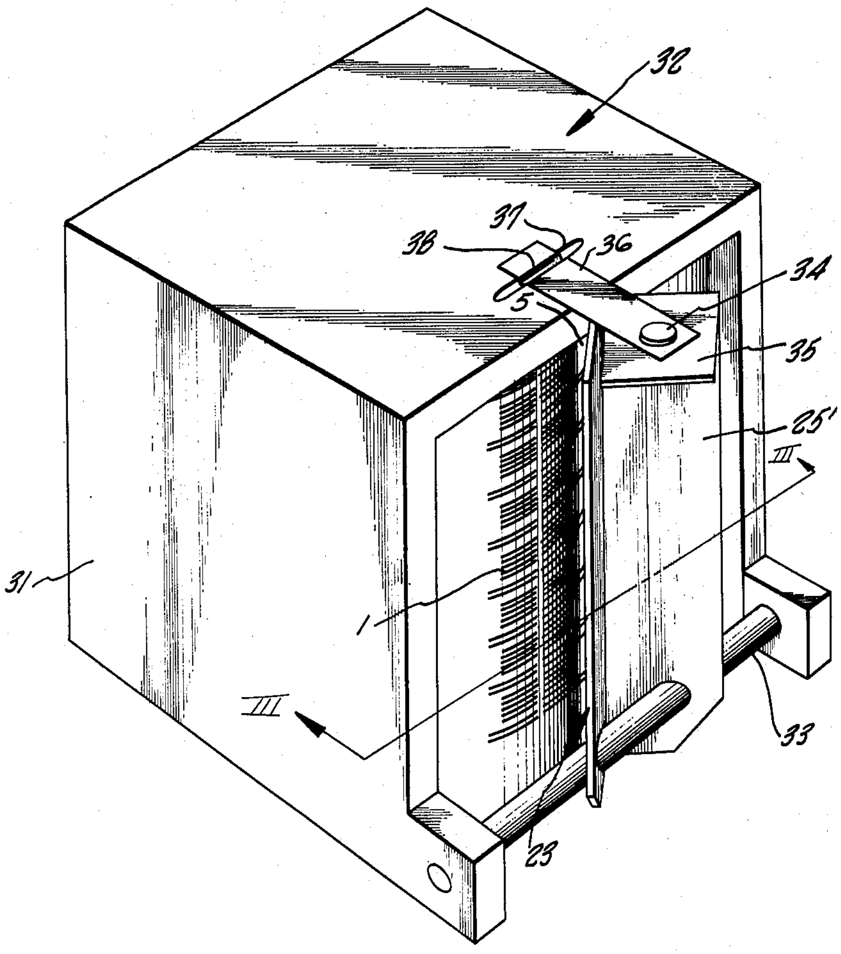
FIG. 4 is a perspective view of the redundant head having the cross-feed shield of FIG. 3 mounted on a bracket to be integral with the redundant head.

In a preferred form of embodiment of the invention, illustrated in FIG. 3, the bracket 25′ comprises a V-shaped channel, and the shield 20′ is comprised of a plate of alternate layers of a high magnetic permeability material and an electrically conducting material mounted to form surface 23 as above described with reference to FIG. 2, and in addition to form a surface indicated generally at 24 disposed on the side of the bracket facing the reading gaps 3, positioned at an acute angle B to the recording medium 8. Angle B is substantially identical to the angle A at which the surface 23 is mounted. The addition of surface 24 to the shield provides an even more substantial barrier to the flux patterns 6 than surface 23 alone, as some flux leakage occurs around the sides of surface 23, which, due to its spherical pattern, is intercepted by the second surface 24 before reaching the area of the reading gaps 3, as schematicaly shown in FIG. 3. Although manufacturing convenience may make it desirable to do so, it is not necessary that the high magnetic permeability material on surface 24 be of as great thickness as that along surface 23. The cross-feed shields 20′ which form the surfaces 23 and 24 in FIGS. 3 and 4 are terminated at the end adjacent the gaps 1 and 3 substantially perpendicular to the planes of the respective surfaces 23 and 24 as shown. This provides an air gap 26 between the ends of the surfaces 23 and 24 adjacent the gaps or recording medium 8. This air gap 26 increases the effectiveness of the cross-feed shield in preventing flux radiated from the writing gap from reaching the reading gap.

The bracket 25 and bracket-channel 25′ of FIGS. 2 and 3 should be made of aluminum or other non-magnetic material.

The cross-feed shield according to this invention is preferably mounted in the required position relative to the head in such manner as to be quickly removable at times when it is desired to clean the head or remove or insert the recording medium. Accordingly, a novel mounting means as shown in FIG. 4 has been provided in which a case 31 having a plurality of sides, a closed end, and having one open end is arranged to hold the redundant head, with the writing gaps 1 and reading gaps 3 exposed by the open end of the case 31. A cylindrical bar 33 may be mounted between the sides of the case 31 at a point beneath the recording medium 8 (not shown in FIG. 4) and the bracket 25′ is rotatably attached thereto. A flange or end piece 35 is provided at the upper end of the bracket 25′ to which an arm 36 is attached by bolt 34 or other suitable means. The arm 36 is adapted to be releasably attached to the top 32 of the case 31, as by having a protruding portion 38 thereon adapted to springingly engage a depression indicated at 37 defined by the top 32 of the case 31. When it is desired to remove the bracket 25′ and shield 20′ the arm 36 is disengaged from the top 32, and the bracket 25′ with arm 36 attached, is rotated downwardly about the cylindrical bar 33. It is helpful to have arm 36 permanently attached to the bracket 25 rather than to the top 32 of the case 31, so that it is not protruding at times when a recording medium, such as tape, is being inserted in the normal manner from the top.

There has thus been disclosed a cross-feed shield which is highly effective, inexpensive to manufacture, and free from the interference of reflected secondary recording.

Various modifications of the invention will be apparent to those skilled in the art, and the enumeration of certain variations herein is not intended to exclude other variations apparent to one skilled in the art but not so listed herein.

I claim:

1. A cross-feed shield for use with a magnetic recording device having a redundant head provided with closely spaced writing and reading gaps and adapted to record upon a magnetic recording medium having a path of movement in relation to the redundant head, comprising:

(a) a plate made of a high magnetic permeability material, (b) the plate being disposed on the side of the magnetic recording medium opposite the redundant head, (c) the plate having a longitudinal base adapted to be positioned adjacent to and parallel to the surface of the magnetic recording medium, and to be disposed transverse to the path of movement of the magnetic recording medium past the redundant head, (d) the longitudinal base being disposed along a line lying between the writing and the reading gaps, (e) the surface of the plate adjacent the writing and reading gaps being inclined away from the magnetic recording medium at an actuate angle thereto and extending laterally in the direction of the writing gaps.

2. A cross-feed shield according to claim 1 in which the longitudinal base of the sheet is disposed midway between the writing and the reading gaps.

3. A cross-feed shield according to claim 1 wherein the acute angle to the magnetic recording medium at which the surface of the sheet is inclined is within the range of from thirty-five degrees to fifty-five degrees inclusive.

4. A cross-feed shield according to claim 1 in which the elongated sheet consists of a lamination of a plurality of layers of a high magnetic permeability material, between each two of which layers is disposed a layer of a metal which is a good electrical conductor.

5. A cross-feed shield for use with a magnetic recording device having a redundant head provided with closely spaced writing and reading gaps and adapted to record upon a magnetic recording medium having a path of movement in relation to the redundant head, comprising:

(a) first and second plates of high magnetic permeability material, adapted to be disposed on the side of the magnetic recording medium opposite the redundant head, (b) each of the plates having a longitudinal base adapted to be positioned adjacent to and parallel to the surface of the magnetic recording medium, and disposed transverse to the path of movement of the magnetic recording medium past the redundant head, (c) the longitudinal bases of the plates being disposed along lines lying between the writing and the reading gaps, (d) the surfaces of the plates adjacent the recording medium being inclined away from the magnetic recording medium at acute angles thereto, the acute angle between each plate and the recording medium being substantially equal to and opposite to the acute angle between the other plate and the recording medium, (e) said surface of the first plate extending laterally in the direction of the writing gaps and said surface of the second plate etxending laterally in the direction of the reading gaps.

6. A cross-feed shield according to claim 5 in which the longitudinal bases of the first and second plates are contiguous and are disposed midway between the writing and the reading gaps.

7. A cross-feed shield according to claim 5 wherein the acute angle to the path of the magnetic recording medium at which the first and second plates are disposed is within the range of from thirty-five degrees to fifty-five degrees inclusive.

8. The combination as defined in claim 7 wherein the ends of said surfaces of the plates adjacent the recording medium are separated by an air gap.

9. A cross-feed shield according to claim 5 wherein the elongated plates consist of a lamination of a plurality of layers of a high magnetic permeability material, between each two of which layers is disposed a sheet of a metal which is a good electrical conductor.

10. A cross-feed shield according to claim 5, including an elongated V-shaped bracket made of a substantially non-magnetic material and disposed transverse to the path of the magnetic recording medium and also disposed on the side of the magnetic recording medium opposite the redundant head, positioned in such manner that the portion of the bracket wherein its sides intersect is nearest the magnetic recording medium, the first plate being carried by one side of the bracket and the second plate being carried by the other side of the bracket, the plates being disposed on the surfaces of the sides of the bracket nearest the magnetic recording medium.

11. The combination comprising:

(a) a magnetic redundant head having closely spaced writing and reading gaps adapted to substantially simultaneously write and read upon a single channel on a magnetic recording medium having a path of movement in relation to the redundant head, (b) first and second plates of high magnetic permeability material adapted to be disposed on the side of the magnetic recording medium opposite the redundant head, (c) each of the plates having a longitudinal base adapted to be positioned adjacent to and parallel to the surface of the magnetic recording medium, and transverse to the path of movement of the magnetic recording medium past the redundant head, (d) the longitudinal bases of the plates being disposed along lines lying between the writing and the reading gaps, (e) the surfaces of the plates being inclined away from the magnetic recording medium at acute angles thereto, the acute angle of each plate being equal to and opposite to the acute angle of the other, (f) the surface of the first plate extending laterally in the direction of the wirting gaps and the surface of the second plate extending laterally in the direction of the reading gaps, (g) a case having a plurality of sides, a closed end, and an open end, the case being arranged to enclose the redundant head in such manner that the writing and reading gaps on the redundant head are exposed by the open end of the case, (h) an elongated V-shaped bracket releasably attached to the open end of the case and disposed transverse to the path of the magnetic recording medium past the redundant head and also disposed on the side of the magnetic recording medium opposite the redundant head, the bracket being so positioned that the portion thereof at which its sides intersect is nearest the magnetic recording medium, (i) the first plate being carried by one side of the bracket and the second plate being carried by the other side of the bracket, the plates being disposed on the surfaces of the sides of the bracket nearest the magnetic recording medium.

12. The combination according to claim 11 including:

(a) an elongated cylindrical rod having its ends carried by sides of the case, (b) the rod being disposed beneath the magnetic recording medium and substantially parallel thereto, and being adjacent an end of the bracket, (c) the sides of the case carrying the rod defining a rod-carrying portion extending outwardly to hold the rod on the side of the magnetic recording medium opposite the redundant head, (d) the end of the bracket adjacent the rod being rotatably attached thereto, (e) an elongated arm attached at one end to the end of the bracket remote from the rod, the other end of the arm being releasably attached to the case.

References Cited by the Examiner

UNITED STATES PATENTS

| | | | |
|---|---|---|---|
| 2,678,970 | 5/1954 | Vilkomerson | 179—100.2 |
| 2,726,286 | 12/1955 | Pettus et al. | 179—100.2 |
| 2,726,287 | 12/1955 | Sharp | 179—100.2 |
| 2,922,231 | 1/1960 | Witt et al. | 179—100.2 |

IRVING L. SRAGOW, *Primary Examiner.*